(12) United States Patent
Thielsen (10) Patent No.: US 6,213,312 B1
(45) Date of Patent: *Apr. 10, 2001

(54) COMPACT DISK STORAGE AND FILING SYSTEMS

(76) Inventor: Richard J. Thielsen, 224 N. Clark Dr., Palatine, IL (US) 60067

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,375

(22) Filed: Jan. 8, 1999

Related U.S. Application Data (63) Continuation of application No. 09/227,375, filed on Jan. 8, 1999.
(60) Provisional application No. 60/094,887, filed on Jul. 31, 1998.

(51) Int. Cl.$^7$ .................................................. A47G 29/00
(52) U.S. Cl. ............................................................ 211/40
(58) Field of Search .................................... 211/40, 41.12, 211/41.1, 162, 94.01

(56) References Cited

U.S. PATENT DOCUMENTS

| | | | | |
|---|---|---|---|---|
| 2,804,212 | * | 8/1957 | Spitzig | 211/40 |
| 2,983,387 | * | 5/1961 | Klein | 211/40 |
| 3,017,999 | * | 1/1962 | Cano | 211/40 |
| 3,258,126 | * | 6/1966 | Frey | 211/40 |
| 5,160,050 | * | 11/1992 | Russo | 211/40 |
| 5,176,264 | * | 1/1993 | De Palma | 211/40 |

* cited by examiner

Primary Examiner—Alvin Chin-Shue
Assistant Examiner—Sarah Purol
(74) Attorney, Agent, or Firm—Palmatier & Zummer; Francois N. Palmatier (57) ABSTRACT

Compact disks (CD's) are stored and filed in transparent plastic pouches mounted on carrier plates, each formed with a pair of slots for slidably and removably hanging each carrier plate on a pair of parallel guide rails supported by a cabinet or a stand. The pouches may be replaced by hubs mounted centrally on the carrier plates for frictionally receiving and retaining the central circular opening of a CD. The slots may be keyhole-shaped with entrance portions having an interference fit with the rails. Alternatively, the slots may be L-shaped for hooking the carriers on the rails. Each plate may have a second transparent pouch on the opposite side of the plate for receiving a label. Similar index plates may have index tabs thereon. Other plates may have CD OUT thereon. The cabinet for supporting the rails may be generally rectangular and may support the rails either horizontally or vertically. Alternatively, the rails may be circular and supported horizontally on a vertical stand which may rotatably support the rails. Instead of being plate-like carriers, each carrier may have a housing with a rectangular cavity therein for snugly receiving a box for a CD.

8 Claims, 6 Drawing Sheets

COMPACT DISK STORAGE AND FILING SYSTEMS

This application is a continuation of the co-pending original patent application of Richard J. Thielsen, Ser. No. 09/227,375, filed Jan. 8, 1999, entitled COMPACT DISK STORAGE AND FILING SYSTEMS, the priority of which is claimed for the present application.

I hereby claim the priority and all other benefits of the PROVISIONAL APPLICATION FOR PATENT OF THE UNITED STATES, Ser. No. 60/094,887, filed Jul. 31, 1998.

FIELD OF THE INVENTION

This invention relates to a new storage and retrieval (i.e. filing) system designed specifically for compact disks (CD's) of various sizes. Compact disks can be audio, video or data (i.e. computer) disks.

BACKGROUND OF THE INVENTION

Unlike CD storage systems now available, the new system of the present invention does not use predetermined slots where the crystal cases or boxes for CD's must reside. The use of predetermined slots does not allow for easy expansion when more disks are purchased. To illustrate; if a predetermined slot system has 50 slots available for CD storage, the purchaser may own 10 CD's whose titles begin with the letter "A", 5 CD'S beginning with the letter "B", 2 CD's with the Letter "C", and so on, until the filing system is partially filled. "Partially filled" assumes the purchaser would not buy a storage system with no room for expansion.

The dilemma occurs when the purchaser buys another CD and there is no slot left to accommodate another "A" CD, for example. However, there are slots available in the "D" and "F" range. The purchaser must then move a significant number of CD's to open up the slot into which he wishes to insert the new CD, until all CD's can then be accommodated without disrupting the alphabetical sequence.

SUMMARY OF THE INVENTION

Since the new system does not use predetermined slots, the purchase of new CD's does not present any such problem, because the old CD's are simply adapted to slide along the system to make room for the new. This result is accomplished through the use of hanging CD carriers or hanging crystal case carriers.

By way of summary, the invention may comprise filing apparatus for filing and storing compact disks (CD's). The apparatus may comprise means affording a pair of substantially parallel slide rails or the equivalent, with support means for the rails. A plurality of carriers are provided including plates having slot means therein for slidably and removably hanging the plates on the rails for sliding movement therealong. The plates may have storage means thereon for removably receiving and storing individual CD's.

The storage means may comprise individual pouches on the individual carrier plates for removably receiving individual CD's. The pouches preferably comprise transparent material. The carrier plates also preferably have additional storage means for receiving descriptive material or the like. The additional storage means preferably comprise additional pouches mounted on the carrier plates for receiving the descriptive material. The additional pouches preferably comprise transparent material for revealing the descriptive material.

The slot means in the carrier plates may comprise entrance portions for receiving the rails with an interference fit for removably retaining the carrier plates on the rails. The slot means may also comprise guide portions connecting with the entrance portions for receiving the rails with a sliding fit. The slide rails are preferably generally cylindrical. The guide portions of the slot means are preferably generally circular for receiving the rails with a sliding fit. The entrance portions of the slot means are slightly smaller than the rails for receiving the rails with an interference fit.

In a modified construction, the slot means comprise a pair of L-shaped slots for hanging the carrier plates on the slide rails.

Each carrier plate preferably comprises first storage means on one side of each carrier plate for removably receiving and storing a CD, and second storage means on the opposite side of each plate for receiving printed matter regarding the CD. The first and second storage means preferably comprise storage pouches on opposite sides of each carrier plate. The first and second storage means preferably comprise first and second transparent storage pouches on opposite sides of each carrier plate.

The filing apparatus may also comprise index plates having slot means therein for slidably and removably hanging the index plates on the rails for sliding movement therealong. The filing apparatus may also include a CD OUT plate having slot means therein for slidably and removably hanging it on the rails for sliding movement therealong.

The filing apparatus may comprise support means comprising a cabinet for supporting the rails. In a modified construction, the rails are generally circular in shape and are generally horizontal. The support means for the rails may comprise a stand for rotatably supporting the rails for rotation about a generally vertical axis.

In a modified construction, the carrier plates for storing CD's are replaced or supplemented by modified carriers for receiving and storing cases for individual CD's. Each CD box carrier preferably has a plate portion with slot means therein for slidably and removably hanging the plate portion on the rails for sliding movement therealong. Each of such carriers has a hollow housing portion connected to the plate portion and having a generally rectangular cavity therein for snugly receiving and frictionally retaining a storage box for a CD. As before, the slot means may be generally L-shaped for removably and slidably hooking each of the carriers on the rails. Alternatively, the slot means may comprise entrance portions for receiving the rails with an interference fit for removably retaining the carrier on the rails, and guide portions connecting with the entrance portions for receiving the rails with a sliding fit.

BRIEF DESCRIPTION OF THE DRAWINGS

Various examples and modifications of the system are disclosed in the accompanying drawings, which are briefly described as follows.

DETAILED DESCRIPTION OF ILLUSTRATIVE EMBODIMENTS

Figure 1:
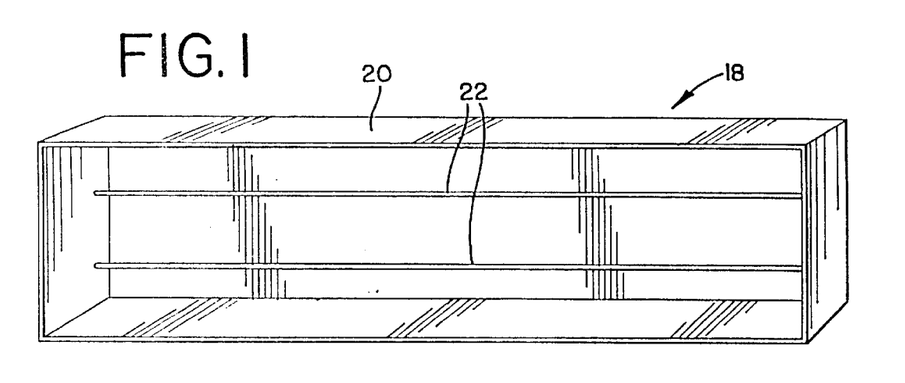
FIG. 1 is a perspective view showing a storage and filing cabinet for the system and having longitudinal rails extending within the cabinet for slidably supporting the CD carriers.

FIG. 1 shows a new CD storage and filing system 18 including a horizontally elongated storage and filing cabinet 20 having elongated horizontal upper and lower walls, left- and right-hand vertical end walls extending therebetween, an elongated vertical rear wall closing the rear of the cabinet 20 and an open front. A pair of elongated vertically spaced horizontal slide rails or rods 22 extend within the cabinet 20 between the left- and right-hand end walls, near but spaced forwardly from the rear wall of the cabinet 20. The slide rails 22 are preferably circular in cross-section and are adapted to provide slidable support for numerous CD carriers 24.

The cabinet 20 is preferably made of metal, but can also be made of resinous plastic material, molded in one piece, or other suitable materials, such as wood, fiberboard etc. The slide rails 22 are preferably made of metal but can be made of molded or extruded plastic material.

Four different versions of the CD carriers 24 are shown in FIGS. 2A, 2B, 3A, 3B, 4 and 5. In all of the versions, the CD carriers 24 are preferably made of resinous plastic material and are generally in the form of substantially rectangular or square plates or cards.

Figure 2A:
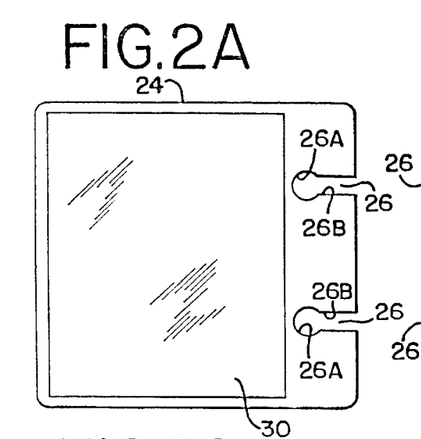
FIG. 2A and FIG. 2B are elevational views showing opposite sides A and B of a first version of the slidable CD carriers.
Figure 2B:
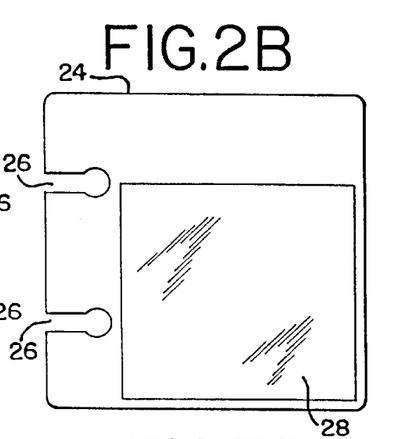

In the first version shown in FIGS. 2A and 2B, the carriers 24 are formed with a pair of vertically spaced keyhole-spaced slots 26 for receiving and sliding along the slide rails 22. Each of the slots 26 has a generally circular slide portion 26A and a substantially horizontal entrance portion 26B adapted to receive the slide rails 22 with a light interference fit whereby the carrier 24 can be pushed rearwardly against the slide rails 22 until the rails 22 are tightly received by the entrance portions 26*b* and then are slidably received by the circular portions 26A with a free sliding fit. By virtue of the interference fit between the entrance portions 26B and the rails 22, the CD carriers 24 are locked in place on the rails 22, so that the carriers 24 will not become detached accidentally from the rails 22. However, the carriers 24 can easily be pulled off the rails 22. Thus, the carriers 24 can be freely slid back and forth to open up more space when the newest CD is purchased. Moreover, the slots 26 allow easy removal and insertion of the CD carriers 24 out of and into the system.

Figures 3A, 3B:
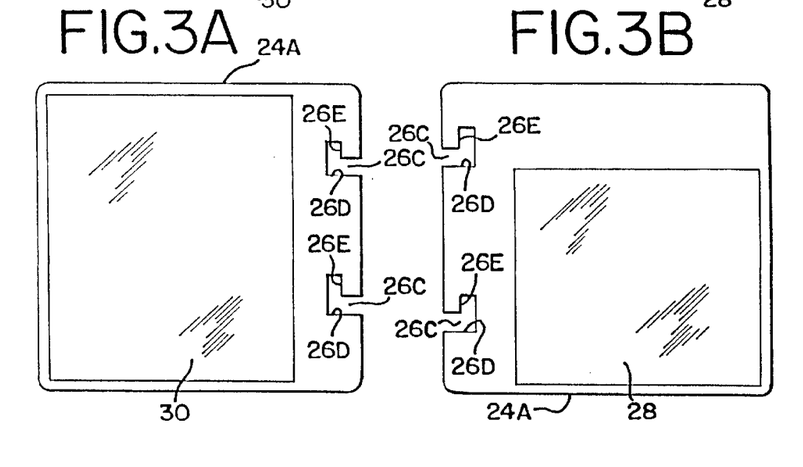
FIG. 3A and FIG. 3B are elevational views showing opposite sides A and B of a second version of the slidable CD carriers.

FIGS. 3A and 3B show opposite sides A and B of a modified CD carrier 24A constituting a second version of the carrier, in which the slots 26 of the first version of the CD carriers 24 are replaced by modified slots 26C which are L-shaped instead of keyhole-shaped. Thus, each modified slot 26C has a generally horizontal entrance portion 26D connecting with an upturned generally vertical inner end portion 26E for slidably receiving the slide rails or rods 22. Both the entrance portion 26D and the upturned end portion 26E of each L-shaped slot 26C have a width greater than the cross-sectional size of the slide rails or rods 22, so as to produce a free sliding fit between the slots 26C and the rails 22.

Each of the modified CD carriers 24A is adapted to be removably mounted on the slide rails 22 by aligning the entrance portions 26D of the L-shaped slots 26C with the rails 22, moving the modified CD carrier 24A rearwardly until the rails 22 are engaging the rear ends of the entrance portions 26D and are opposite the lower ends of the upturned portions 26E, and lowering the modified CD carrier 24A downwardly until the rails 22 engage the upper ends of the upturned portions 26E of the L-shaped slots 26C. The downward force of gravity upon each modified CD carrier 24A maintains the upper ends of the L-shaped slots 26C in sliding engagement with the rails, so that the modified CD carrier 24A can be slid freely along the rails 22 to any desired position not already occupied by another CD carrier 24A. Each CD carrier 24A can easily be removed from the rails 22 by lifting the carrier 24A upwardly until the rails 22 are opposite the entrance portions 26D of the slots 26C, and then moving the CD carrier 24A forwardly until the entrance portions 26D of the L-shaped slots 26C are free and clear of the rails 22, whereby the CD carrier 24A is fully removed from the rails 22. By virtue of the L-shape of the modified slots 26C, the modified CD carrier 24A can easily be mounted and effectively locked or retained on the rails 24, while the modified CD carriers 24A are freely slidable along the rails.

Each of the CD carriers 24 and 24A is provided with means for removably receiving a CD or a brochure or label for describing the CD, for storage and easy removal. In the disclosed CD carriers 24 and 24A, such means take the form of a pocket or pouch 28 secured to or formed in one piece with one side, called side B above, of each CD carrier 24, as shown in FIGS. 2A and 2B, and each modified CD carrier 24A of FIGS. 3A and 3B. In the present construction, the pocket or pouch 28 is mounted or formed on side B of the CD carrier 24 shown in FIG. 2B, and on side B of the modified CD carrier 24A, as shown in FIG. 3B. In each case, the pocket or pouch 28 is generally rectangular or square in shape and is open on one edge, preferably the upper edge, while being closed around the other three edges. The pocket or pouch 28 is preferably formed by a resinous plastic sheet cemented, sealed, bonded or otherwise secured to side B of each of the CD carriers 24 and 24A, or formed in one piece therewith. The size of the pocket or pouch 28 is preferably such that one edge portion of a CD projects out of the pouch and thus is clearly visible to show that the pouch 28 is occupied by a CD. As an alternative, the pouch 28 may be formed with one or more openings through which the CD can be seen. As shown in FIGS. 2B and 3B, the pocket or pouch 28 is preferably made of transparent material so that a CD in the pouch 28 will be clearly visible. The size and construction of the pocket or pouch 28 is such that a CD can be easily inserted into and removed from the pocket or pouch 28.

Each of the CD carriers 24 and the modified CD carriers 24A also preferably comprises means for receiving a printed album cover, label or brochure which may show the name of the CD and the musical selections, computer programs or other material recorded on the CD. The album cover or brochure may be derived from the crystal case or box in which the CD was originally contained when purchased.

As shown in FIGS. 2A and 3A, such brochure receiving means preferably takes the form a transparent pocket or pouch 30 mounted on each CD carrier 24, as shown in FIG. 2A, and on each modified CD carrier 24A as shown in FIG. 3A. The transparent pocket or pouch 30 preferably takes the form of a sheet of transparent resinous plastic material cemented, sealed, bonded or otherwise secured to side A of the CD carrier 24 shown in FIG. 2A, and to side A of the modified CD carrier 24A, shown in FIG. 3A. The transparent pocket or pouch 30 is preferably secured to each of the CD carriers 24 and the modified CD carriers 24A along three edges of the pocket or pouch 30, leaving the fourth edge open for easy insertion and removal of the printed album cover, label or brochure.

The CD carriers 24 and 24A can be molded in one piece of a transparent resinous plastic material so that the transparent pockets or pouches 28 and 30 are formed on the opposite sides of each CD carrier. The size and shape of the pockets or pouches 28 and 30 may be such that CD's can be removably stored in either or both of the pouches 28 and 30. Alternatively, the pocket or pouch 28 may be used to store a CD, and the pocket or pouch 30 can be used to receive a printed album cover, label or brochure, as previously described.

Figure 4:
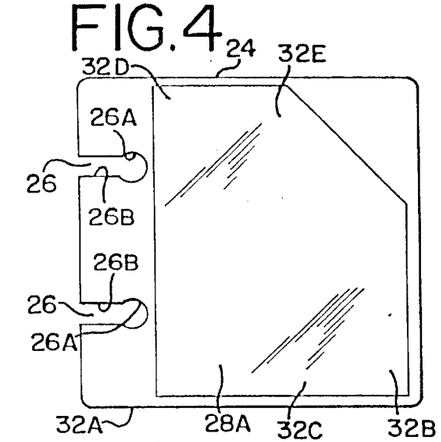
FIG. 4 is an elevational view showing side B of a third version of the slidable CD carriers.

FIG. 4 shows side B of the basic CD carrier 24 having a slightly modified pocket or pouch 28A for receiving and storing a CD so that it is visible in the pocket or pouch 28A and is easily removable therefrom. The pocket or pouch 28A takes the form of a transparent sheet or piece of resinous plastic material having three of its sides cemented, sealed, bonded or otherwise secured to side B of the CD carrier 24. The two side edges and the bottom edge of the transparent pocket or pouch 28A are thus secured to the CD carrier 24, while the upper end of the pocket or pouch 28A is left open for easy insertion of a CD.

As shown in FIG. 4, the pocket or pouch 28A has a horizontal upper edge portion 32 and downwardly slanting upper edge portion 34, so that a CD received in the pocket or pouch 28A will project outwardly beyond the slanting edge portion 34, whereby the projecting edge portion of the CD can easily be grasped for removal of the CD from the pocket or pouch 28A. In FIG. 4, the slanting upper edge portion 34 of the transparent pocket or pouch 28A extends downwardly at an angle of about 45 degrees from the horizontal, but the angle can be varied. As previously described, the CD carrier 24 of FIG. 4 has a pair of keyhole-shaped mounting slots 26.

Figure 5:
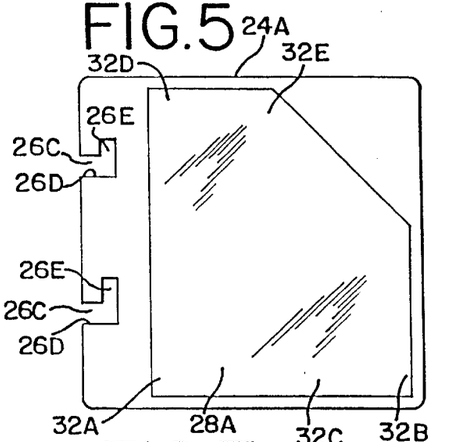
FIG. 5 is an elevational view showing side B of a fourth version of the slidable CD carriers.

FIG. 5 shows side B of the modified CD carrier 24A having L-shaped mounting slots 26C. FIG. 5 is similar to FIG. 4, in that the modified CD carrier 24A is provided with the same slightly modified transparent pocket pouch 28A, secured to side B of the modified CD carrier 24A. The only difference between FIGS. 4 and 5 resides in the fact that the CD carrier 24 of FIG. 4 has a pair of keyhole-shaped mounting slots 26, while the modified CD carrier 24A of FIG. 5 has L-shaped mounting slots 26C.

Figure 6:
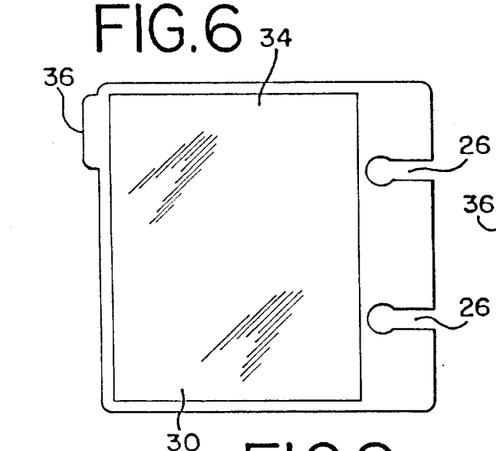
FIG. 6 is an elevational view showing one side of an alphabetical indexing CD carrier.
Figure 7:
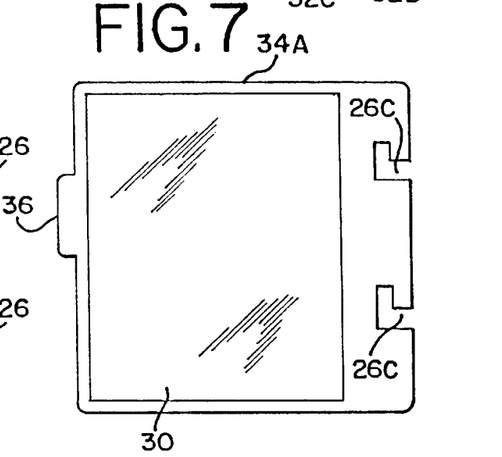
FIG. 7 is an elevational view showing one side of a second version of an alphabetical indexing CD carrier.

The CD storage and filing system 18 of the present invention preferably includes at least two types of specialty CD carriers or cards adapted to be slidably mounted on the slide rails or rods 22. The first type comprises alphabetical indexing carriers or cards 34 and 34A, as shown in FIGS. 6 and 7. The alphabetical indexing cards 34 and 34A are formed with alphabetical indexing tabs 36 which are marked with the letters of the alphabet. The tabs 36 project outwardly from the alphabetical indexing carriers or cards 34 and 34A on the vertical edges thereof remote from the edges in which the mounting slots 26 and 26C are formed. As previously described, the mounting slots 26 are keyhole-shaped, while the mounting slots 26C are L-shaped.

As shown in FIGS. 6 and 7, the alphabetical indexing carriers or cards 34 and 34A are provided with the transparent pockets or pouches 30, mounted or formed on one side of the carriers or cards 34 and 34A, for easy insertion and removal of a printed album cover, label or brochure, as previously described. Alternatively, the transparent pockets or pouches 30 may be employed for removably receiving and filing a CD. The transparent pockets or pouches 30 may be mounted or formed on both sides of the alphabetical indexing carriers or cards 34 and 34A for removably receiving two CD's, or one CD and a printed album cover, label or brochure, or two such printed items. As another alternative, one of the transparent pockets or pouches 30 may be mounted or formed on one side of each of the alphabetical indexing carriers or cards 34 and 34A, while one of the modified pockets or pouches 28A may be mounted or formed on the other side of each of the alphabetical indexing carriers or cards 34 and 34A, for removably receiving and storing a CD.

As a further alternative, the pockets or pouches 28, 28A and 30 may be omitted entirely from the alphabetical indexing carriers or cards 34 and 34A. The carriers or cards 34 and 34A may also be referred to as alphabetical indexing dividers.

The alphabetical indexing carriers or cards 34 and 34A are freely slidable along the slide rails or rods 22 and may be removed from or mounted on the rails 22 at any location along the rails 22.

Figure 8:
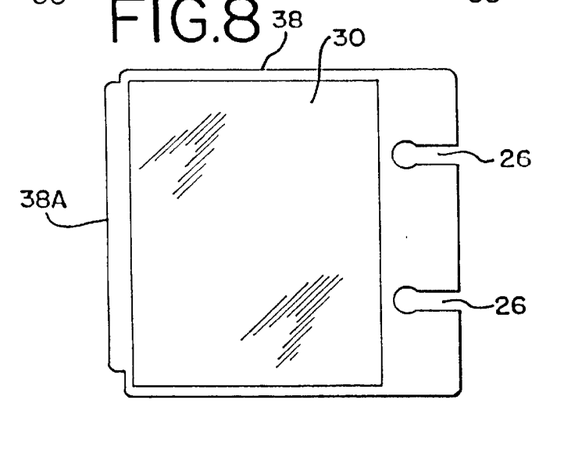
FIG. 8 is an elevational view showing one side of a "CD OUT" card.

The second type of the specialty CD carriers or cards comprises a CD OUT card 38, shown in FIG. 8. The purpose of this card 38 is simply to mark the location of a CD carrier 24 or 24A which is removed from the rails 22 of the CD filing and storage system 18. For example, when a CD carrier 24 or 24A is removed from the system 18 for use, the CD OUT card 38 is mounted on the rails 22 in its place, for marking the exact location of the missing carrier 24 or 24A. When the missing CD carrier 24 or 24A is about to be refiled, the user can quickly and easily find its proper location by looking for the CD OUT card 38. The CD OUT card 38 is then removed from the rails 22, and the loose CD carrier 24 or 24A is put back on the rails 22 in the proper place of the CD carrier 24 or 24A.

The CD OUT card 38 shown in FIG. 8 is formed with the keyhole-shaped mounting slots 26, but the L-shaped slots 26C can alternatively be employed. The complete filing system 18 may include several of the CD OUT cards 38 for use in case two or more CD carriers 24 or 24A are removed from the slide rails 22 of the filing system 18. The CD OUT cards 38 may include means for identifying the CD which is represented by the CD OUT card 38. Such means may comprise one of the transparent pockets or pouches 30, mounted on the CD OUT card 38, or formed in one piece therewith. An appropriately marked slip of paper may be inserted into the transparent pouch 30 to identify the removed CD which is represented by the CD OUT card 38.

As described thus far, the CD carrier 24 and modified carrier 24A comprise a pocket or pouch 28 or 28A for removably receiving and retaining a CD for storage in the CD filing system 18 of the present invention. As an alternative, the pocket or pouch 28 or 28A may be replaced by a hub formed or mounted on side B of the CD carrier 24 or the modified CD carrier 24A. The construction of the hub may be similar to the construction of hubs usually provided in conventional CD cases or boxes in which CD's are usually packaged. The hub on side B of the CD carrier 24 or 24A fits tightly in the central opening formed in the CD, to retain the CD on the hub against accidental removal, while enabling a person to pull the CD off the hub without any great effort.

As shown in FIG. 8, the CD OUT card 38 is formed with a tab or projection 38A which is adapted to project beyond the CD carriers 24 and 24A, so that the CD OUT card 38 can easily be found when it is mounted on the slide rails 22. The color of the CD OUT card 38 is preferably different from the color of the CD carriers 24 and 24A to assist in finding the CD OUT card 38. In addition, the tab 38A may be mark with the words CD OUT.

FIG. 8 shows one side of the CD OUT card 38, and such side may be regarded as the front side. There is no need to illustrate the back or reverse side of the CD OUT card 38, because its shape will be evident to anyone skilled in the art. Optionally, the reverse side of the CD OUT card 38 may be provided with a transparent pocket or pouch 30 for receiving a label, brochure or a piece of paper with an identifying legend thereon. However, the provision of a pocket or pouch 30 on the reverse side is not usually necessary, and such pocket or pouch 30 may be omitted.

Figure 9:
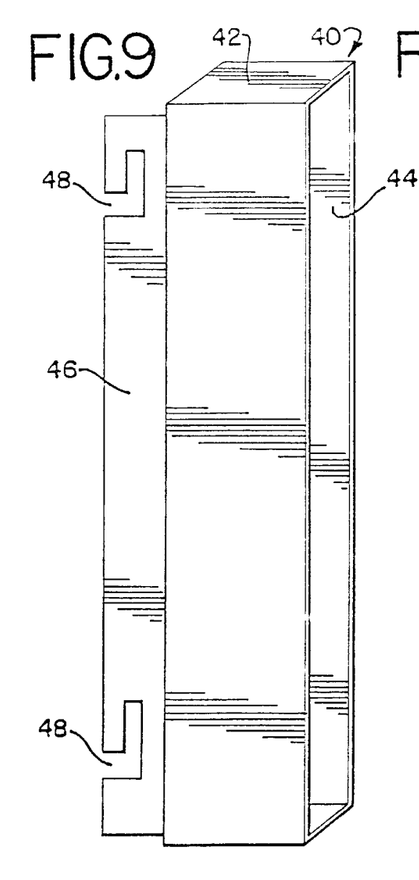
FIG. 9 is a perspective view of a crystal case carrier having a slot or pocket for receiving a crystal case or box for containing a CD.

FIG. 9 illustrates a modified carrier 40 for receiving and holding a crystal case or box of the type used for packaging CD's for shipment, sale and storage. The carrier 40 has a generally rectangular housing or holder 42 having a generally rectangular pocket or cavity 44 therein for snugly receiving the crystal case which is frictionally retained therein. The pocket 44 has five closed sides and one open side for snugly receiving the crystal case.

As shown in FIG. 9, the carrier 40 has a vertical plate or flange 46 projecting rearwardly from the housing 42 and formed with a pair of L-shaped mounting slots 48, similar to the L-shaped slots 26C, previously described. The slots 48 are adapted to be slidably mounted on the rails 22 so that the carrier 40 can slide freely along the rails 22, the same as the previously described CD carriers 24A. The CD case carriers 40 are preferably molded in one piece of a resinous plastic material, but the carriers 40 may be otherwise fabricated. It will be understood that keyhole-shaped slots similar to the previously described slots 26 can be substituted for the L-shaped slots 48.

For use, the carrier 40 is simply slipped onto the original CD case, thereby enabling the CD to be filed within the cabinet 20 of the storage and filing system 18. The crystal case carrier 40 has the same type of mounting slots 48 to lock into sliding engagement with the slide rails 22, as do the hanging CD carries 24 and 24A. Although the crystal case carriers 40 are interchangeable with the regular CD carriers 24 and 24A, the two are not intended to be used with the same filing system 18.

The CD filing and storage cabinet 20 is stackable vertically with other similar cabinets. The cabinet 20 may include any known or suitable means for aligning and holding the cabinets 20 in a stable, vertical stack. The aligning means may also fasten the stacked cabinets 20 together so that the entire stack can readily be lifted and moved, as desired.

The CD filing and storage cabinet 20 may be provided with a hinged or sliding door or a removable cover for closing the open front side of the cabinet 20 to exclude dust from the cabinet 20.

Figure 10:
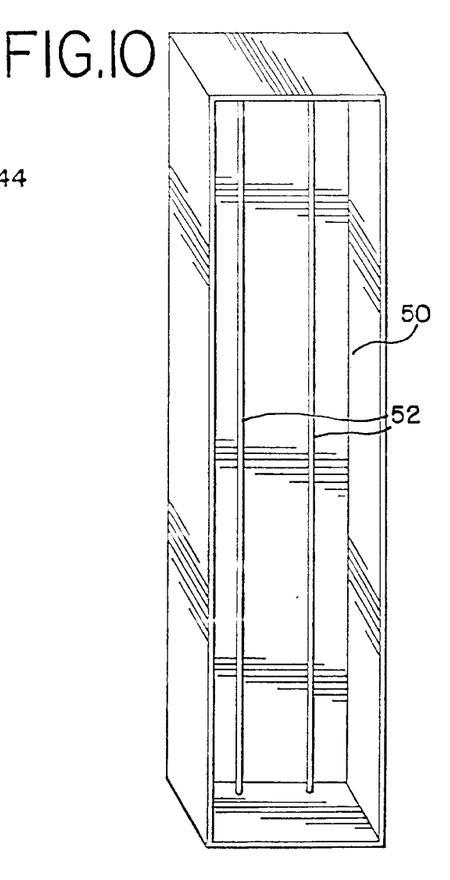
FIG. 10 is a perspective view of a vertically oriented storage and filing cabinet for a modified system having a pair of vertical slide rails for slidably receiving CD carriers or CD crystal case carriers.

FIG. 10 shows a modified CD filing and storage cabinet 50 which is the same as the cabinet 20 except that the modified cabinet 50 is vertically oriented. The cabinet 50 may be made of sheet metal or may be molded in one piece of a suitable resinous plastic material. The cabinet 50 may also be otherwise fabricated. As shown in FIG. 10, the cabinet 50 has two vertical side walls, a vertical rear wall, and upper and lower end walls. The side and end walls are vertically elongated. The cabinet 50 is adapted to stand in a vertical position on one of its end walls.

The CD filing and storage cabinet 50 is stackable horizontally with other similar cabinets. For this purpose, the cabinets 50 may include any known or suitable means for aligning and holding the cabinets 50 in a stack. The aligning means may also fasten the stacked cabinets 50 together so that the entire stack can easily be lifted and moved, as desired.

The cabinet 50 is provided with a pair of spaced, substantially parallel, vertical guide rails or bars 52 located within the cabinet 50, near but spaced from the vertical rear wall thereof, for slidably receiving the CD carriers 24, the alphabetical indexing carriers or cards 34 and the CD OUT cards 38, all of which have the keyhole-shaped mounting slots 26. All of these carriers and cards tend to gravitate toward the bottom of the cabinet 50, but can easily be filed in alphabetical order along the slide or guide rails 52. The CD case carriers 40 can also be slidably mounted on the rails 52 if the carriers are modified to employ the keyhole-shaped mounting slots 26, instead of the L-shaped slots 26C.

The CD filing and storage cabinet 50 may be provided with a hinged or sliding door or a removable cover for closing the open front side of the cabinet 50 to exclude dust therefrom.

Figure 11:
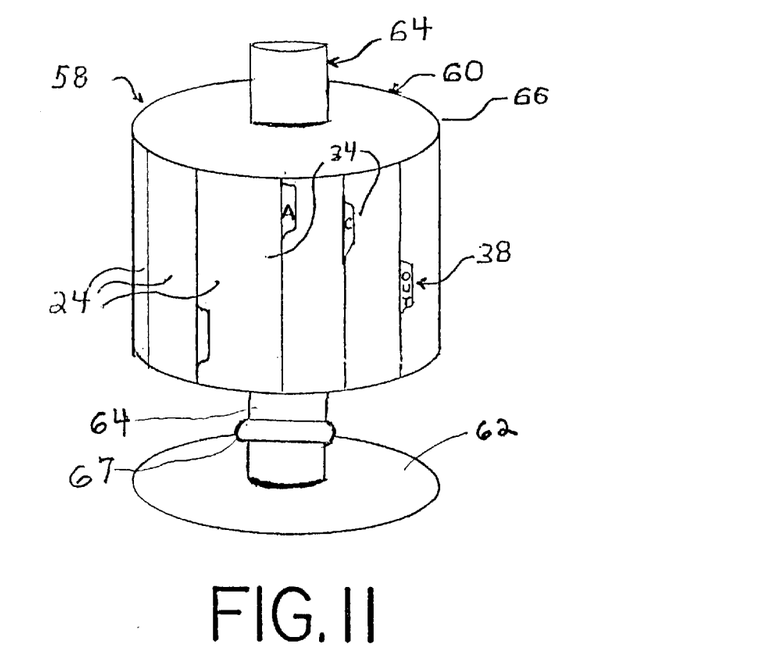
FIG. 11 is a perspective view of a rotary or circular CD filing and storage system for holding CD carriers or CD crystal case carriers.

As described herein, the CD storage and filing system 18 may be characterized as a linear system which may be oriented either horizontally or vertically. FIG. 11 shows a generally circular system 58 for filing and storing CD's. The system 58 comprises a generally circular supporting structure 60 having a generally circular base 62, a substantially vertical center post or spindle 64, and a generally circular top cover 66 which is mounted on the upper end of the post or spindle. The cross-section of the center post or spindle 64 is preferably generally circular. The center post of spindle 64 is preferably rotatably mounted on the circular base 62, such as by means of a swivel joint 67, for example.

The circular system 58 also comprises a pair of horizontal vertically spaced guide and slide rails 68 for receiving and supporting the previously described CD carriers 24 and 24A, the alphabetical indexing carriers or cards 34 and 34A, and the CD OUT cards 38. The guide and slide rails 68 are preferably circular in cross-section. All of these carriers and cards are easily mounted and locked on the circular guide and slide rails 68 in the same manner as described in connection with the linear guide and slide rails 22. Likewise, all of these carriers and cards are easily removable from the circular guide and slide rails 68, as previously described in relation to the linear rails 22. The CD case carriers 40 can also be easily mounted and locked on the circular guide and slide rails 68, and easily removed therefrom, as described in relation to the linear rails 22.

Figure 12:
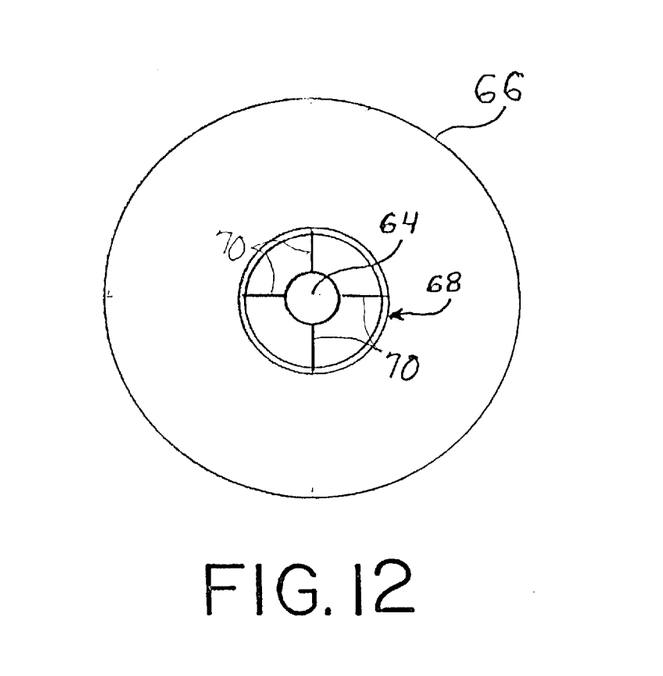
FIG. 12 is a top or plan view of the rotary or circular CD filing and storage system with the top wall thereof removed to reveal internal details of the system.
Figure 13:
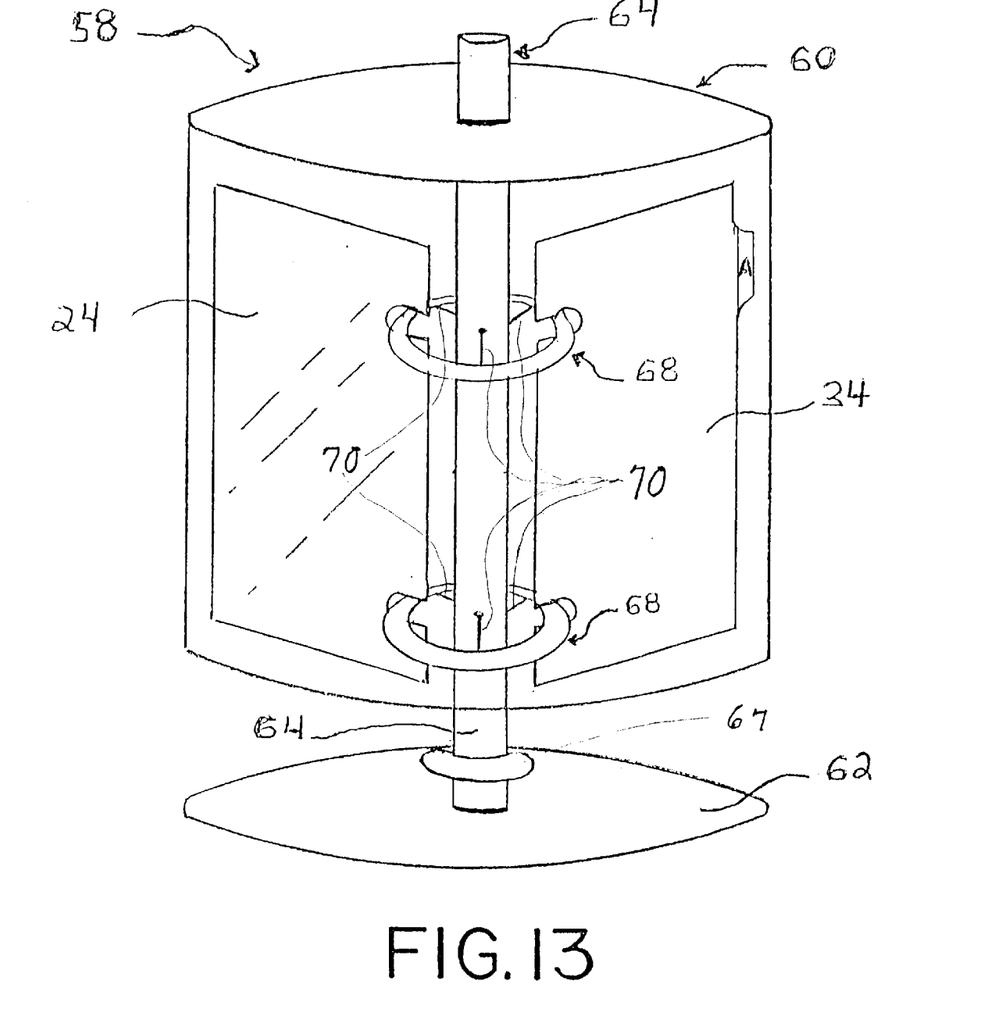
FIG. 13 is a front perspective view somewhat similar to FIG. 11 but with front portions of the system broken away or removed to reveal internal details.

The substantially vertical center post or spindle 64 constitutes means for supporting the generally circular guide and slide rails 68, but additional means are also provided in the illustrated construction, comprising generally radial supporting arms or spokes 70 extending between the center post 64 and the generally ring-shaped rails 68. The supporting arms 70 are secured to the center post 64 and the ring-shaped rails 68 or may be formed in one piece with either the post 64 or the rail 68 or all of them. The diameter or size of the supporting arms 70 may be varied. The number and location of the supporting arms 70 may also be varied. For example, four of the supporting arms 70 are shown in the top view of FIG. 12, while three of the supporting arms 70 are shown in the front perspective view of FIG. 13, in which there are two sets of three supporting arms 70, extending between the center post 64 and the upper and lower ring-shaped rails 68.

The components of the circular filing and storage system 58 may be made of any suitable materials, such as metal or various resinous plastic materials.

The circular system 58 may be stackable vertically with other similar circular systems, and may be provided with means for aligning and connecting the circular systems 58 to enhance the stability of the stack. The aligning means may also include means for fastening the circular systems 58 together in stacked relation, so that the stack can be easily picked up and carried.

The circular system 58 for filing and storing CD's may be provided with a generally cylindrical and bell-shaped dust cover which can be placed over the system 58 for excluding dust. Alternatively, the system 58 may have an outer housing or cabinet having one or more hinged or sliding doors for gaining access to the CD carriers 24 and 24A as well as the indexing cards 34 and 34A and the CD OUT cards 38. The door or doors may be closed to exclude dust.

Figure 14:
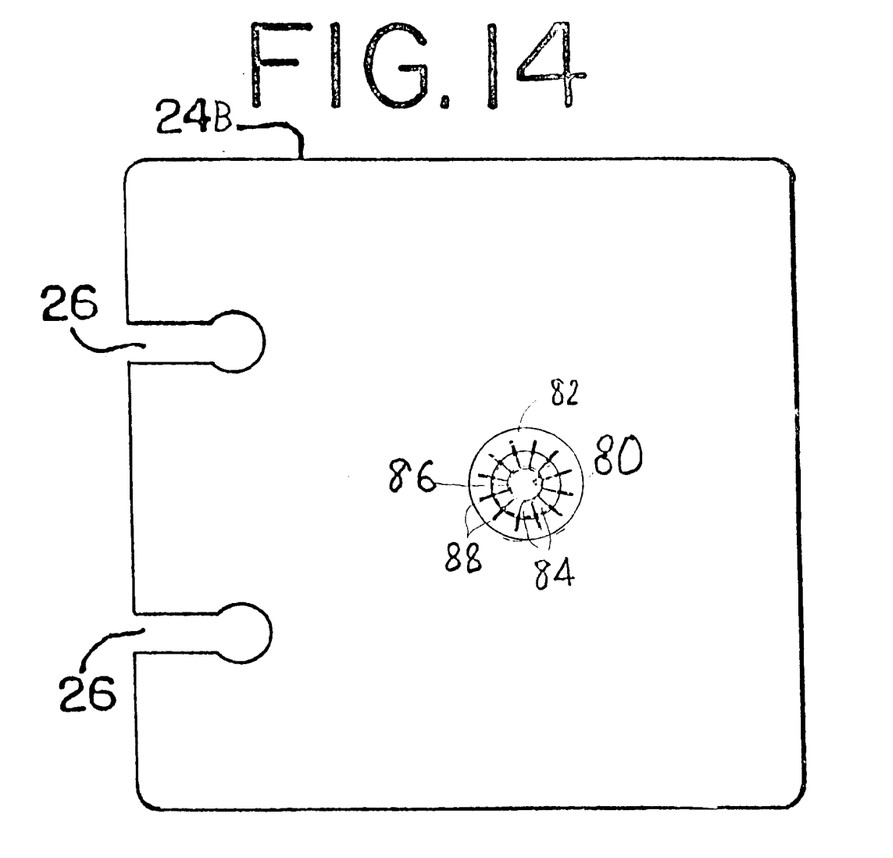
FIG. 14 is an elevational view showing another modified version of the slidable CD carriers having modified means for holding the compact disks.

FIG. 14 illustrates another modified slidable carrier 24B for removably supporting a compact disk (CD) for filing and storage. The carrier 24B has a pair of the vertically spaced keyhole-shaped slots 26 adapted to be removably mounted on the guide rails 22 for sliding movement therealong, the same as described in connection with FIGS. 2A and 2B.

However, the modified carrier 24B of FIG. 14 has different means for removably receiving and supporting a CD. As shown in FIG. 14, such means take the form of a hub or stud 80 mounted on the modified carrier 24B or formed in one piece therewith. The hub 80 is adapted to receive the central hole formed in a standard CD. The hub 80 is the same as or similar to the usual hub formed in a conventional crystal case in which a conventual CD is usually sold.

As shown in FIG. 14, the hub 80 projects outwardly from a boss 82 which is centrally located on the carrier 24B. The boss 82 is adapted to be engaged by a CD around its central hole to ensure that the rear side of the CD is spaced away from the carrier 24B. The inner side of the circular hole in the CD is adapted to be frictionally retained on the hub 80.

As shown in FIG. 14, the hub 80 is formed with several spring fingers 84 which project outwardly from the boss 82 and then radially inwardly toward the central axis of the hub 80. A central hole 86 is formed in the outer end of the hub 80 so that the spring fingers 84 can be pressed inwardly by the circular edge of the hole in the CD.

As shown in FIG. 14, generally radial slots 88 are formed in the hub 80 and the boss 82 between the spring fingers 84 so that each of the fingers 84 is individually flexible and resilient. The construction involving the hub 80, the boss 82, the spring fingers 84, the central hull 86 and the slots 88 constitutes alternative means for receiving and supporting the compact disks. Such means may be employed instead of the transparent pocket or pouch 28 shown in FIG. 2B. However, the reverse side of the carrier 24B is still preferably provided with the transparent pocket or pouch 30 for receiving the label or brochure relating to the CD.

It will be understood that the CD carrier 24B of FIG. 14 can be modified by substituting the L-shaped slots 26C of FIGS. 3A and 3B for the keyhole-shaped slots 26, both of which are suitable for slidably and removably mounting the carrier 24B on the guide rails 22. Other equivalent mounting slots may also be employed.

The hub 80 and the boss 82 can be molded in one piece from a resinous plastic material. Preferably, the carrier 24B, the hub 80 and the boss 82 are molded in one piece.

All systems disclosed herein include all or part of the following:
1. CD storage carriers, whose number varies with the size of the system;
2. One or more CD OUT cards;
3. One set of alphabetical indexing CD carriers or cards;
4. One storage cabinet or container;
5. Assembly and use instructions; and
6. CD crystal case carriers.

After the initial purchase of the system, the purchaser can buy additional items of the system separately.

I claim:

1. Filing apparatus for filing and storing compact disks (CD's) having respective central circular holes therein,
   said apparatus comprising means affording a pair of substantially parallel upper and lower slide rails having a generally circular cross section,
   support means for supporting said rails,
   a plurality of carrier plates molded in one piece from a resinous plastic material having slot means formed in one piece therewith for slidably and removably hanging said carrier plates on said rails for sliding movement therealong,
   each of said carrier plates having a first resinous plastic storage pouch mounted on one side thereof for removably receiving and storing a CD,
   each of said carrier plates having a second resinous plastic storage pouch mounted on the opposite side thereof capable of storing informational material relating to the CD,
   said second storage pouch also being capable of receiving and storing a second CD,
   at least one of said storage pouches being made of a transparent resinous plastic material for revealing the contents thereof.

2. Filing apparatus according to claim 1,
   in which said slot means comprise first and second slots formed in each of said carrier plates,
   each of said slots being keyhole shaped and having an entrance portion for receiving said rails with an interference fit for removably retaining said carrier plates on said rails,
   each of said slots comprising a guide portion connecting with said entrance portion for receiving one of said rails with a sliding fit,
   whereby said carrier plates are freely slidable along said rails.

3. Filing apparatus according to claim 1,
   in which said slot means are generally L-shaped for slidably and removably hooking said carrier plates on said rails.

4. Filing apparatus according to claim 1,
in which said support means comprise a cabinet for supporting said rails.

5. Filing apparatus according to claim 1,
in which said rails are generally circular in shape and are generally horizontal,
said support means comprising a stand for rotatably supporting said rails for rotation about a generally vertical axis.

6. Filing apparatus for filing and storing compact disks (CD's) having respective central circular holes therein,
said apparatus comprising means affording a pair of substantially parallel slide rails,
support means for supporting said rails,
a plurality of carrier plates molded in one piece from a resinous plastic material and having slot means formed in one piece thereon for slidably and removably hanging said carrier plates on said rails for sliding movement therealong,
and resinous plastic storage means on one side of each of said carrier plates for removably receiving and storing a CD,
said resinous plastic storage means on each of said carrier plates comprising a hub mounted on and projecting from said carrier plate for reception in the central hole in a CD for removably retaining the CD for storage thereof.

7. Filing apparatus according to claim 6,
in which said hub is molded in one piece with said carrier plate.

8. Filing apparatus for filing and storing compact disks (CD's) contained initially in CD storage boxes,
said apparatus comprising means affording a plurality of substantially parallel slide rails,
support means for supporting said rails,
and a plurality of carriers having plate portions thereon with slot means therein for slidably and removably hanging said plate portions on said rails for sliding movement therealong,
each of said carriers having a hollow housing portion connected to said plate portion,
said housing portion having a generally rectangular cavity therein for snugly receiving and frictionally retaining one of the storage boxes for a CD.

\* \* \* \* \*